Jan. 10, 1961  S. KLOOSS  2,967,603
CONVEYOR CONTROL SYSTEM
Filed Aug. 20, 1959  5 Sheets-Sheet 1

INVENTOR
SIEGFRIED KLOOSS
BY
ATTORNEYS

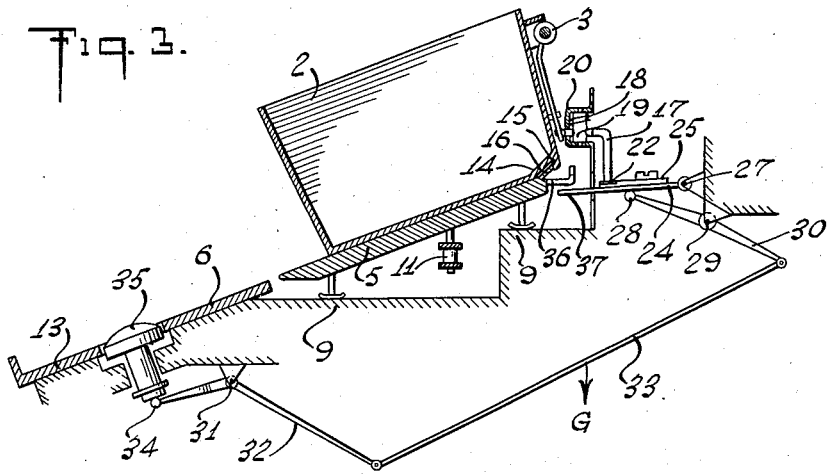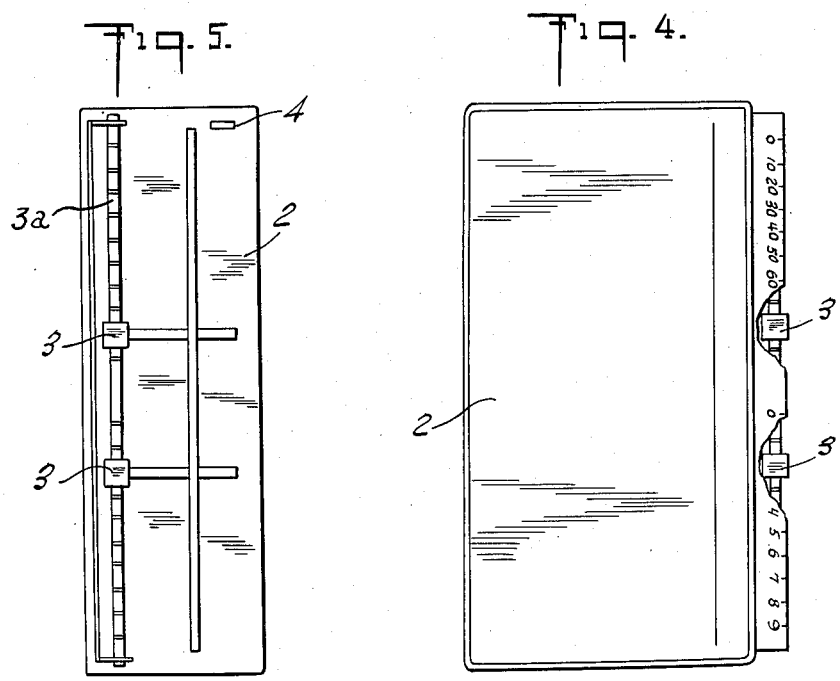

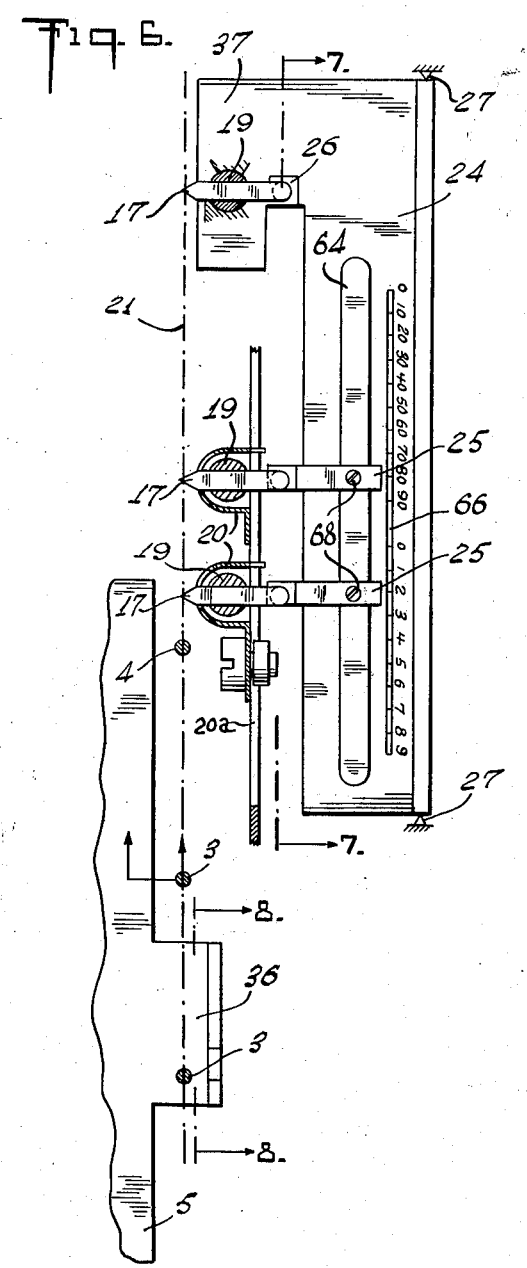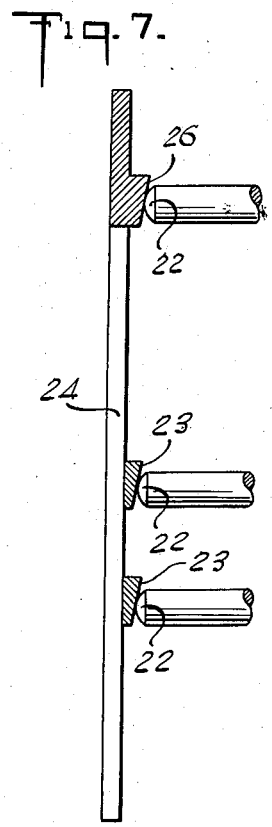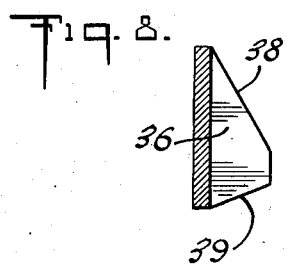

Jan. 10, 1961 S. KLOOSS 2,967,603
CONVEYOR CONTROL SYSTEM
Filed Aug. 20, 1959 5 Sheets-Sheet 4
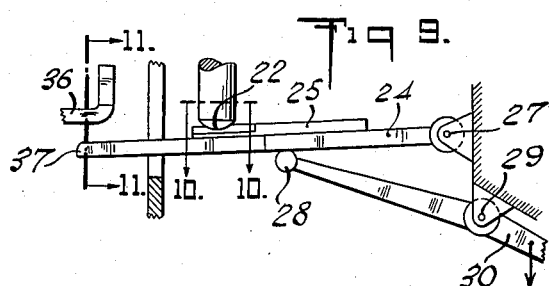
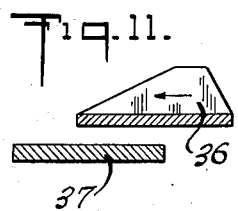
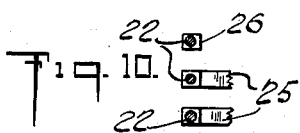
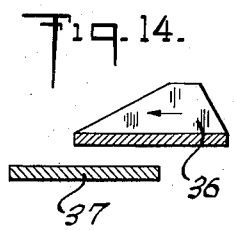
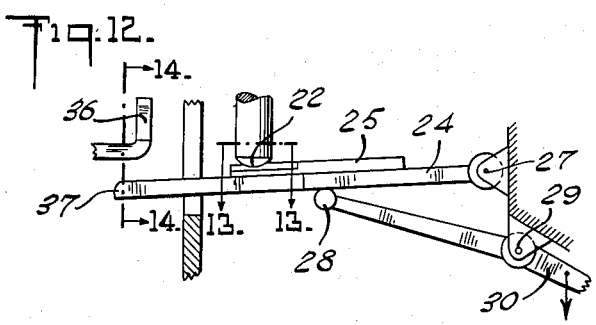
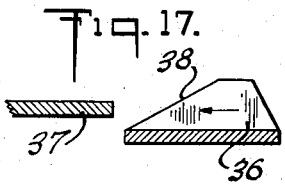
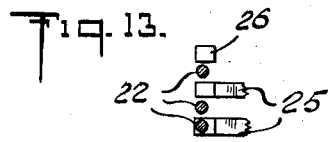
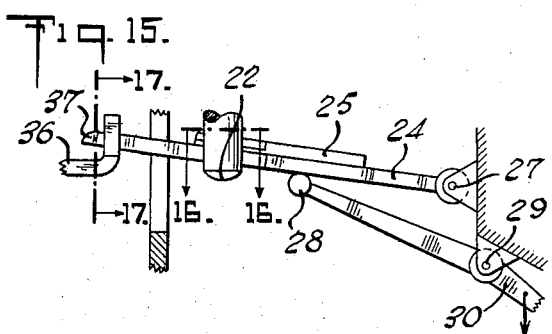
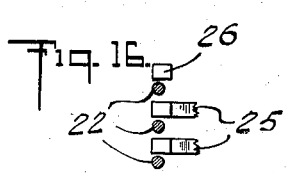
INVENTOR
SIEGFRIED KLOOSS
BY
ATTORNEYS Jan. 10, 1961  S. KLOOSS  2,967,603
CONVEYOR CONTROL SYSTEM
Filed Aug. 20, 1959  5 Sheets-Sheet 5

INVENTOR
SIEGFRIED KLOOSS
BY
ATTORNEYS

United States Patent Office 2,967,603
Patented Jan. 10, 1961

2,967,603
CONVEYOR CONTROL SYSTEM

Siegfried Klooss, Taucha, near Leipzig, Germany, assignor to VEB Schuh- und Sattlermaschinenbau Leipzig, Leipzig, Germany Filed Aug. 20, 1959, Ser. No. 835,035
10 Claims. (Cl. 198—38)

This invention relates in general to conveyor systems and to a new and useful conveyor system for distributing goods in a continuous manufacturing operation and including control means for selectively discharging containers at various operating stations.

The present invention is particularly concerned with a conveyor system which is designed to operate to position various assembly parts and the like at various work stations for particular operations thereon. Automatic control devices for distributing and discharging goods at certain stations which are in use at the present time are either made for travel over predetermined paths without having any discharging station or they are provided with loading and unloading members which cause delay and make the mechanical sequence of operation more complex.

The present invention is an improvement over such devices particularly in the provision of simple mechanism including adjustable control portions on a container which is moved around on a conveyor system and cooperating adjustable controls located at a plurality of stations along the conveyor route which are affected to discharge containers which are set to align with the controls of a given station. The arrangement permits the keying of a container to a station so that it may be moved around by the conveyor until it is aligned with the station for discharge from the conveyor to the station. The arrangement also includes automatic controls for continuing the movement of the container on the conveyor in those instances when the station for which it is keyed to be deposited is already occupied by another container.

Accordingly, it is an object of this invention to provide a conveyor system for distributing containers to various operating stations including control means for selectively discharging containers at predetermined stations.

A further object of the invention is to provide a conveyor system including a movable endless belt conveyor for transporting containers around through a pass intersecting a plurality of operating stations and including adjustable controls on the container and the operating station which are effective to discharge those containers having their control set to cooperate with the control setting of the operating station.

A further object of the invention is to provide a conveyor system including control means for selectively discharging goods at various stations along the conveyor path which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

Fig. 3 is a fragmentary enlarged sectional view similar to Fig. 1 but indicating the conveyor control mechanism in greater detail;

Fig. 4 is a top plan view of a container for the distributing system;

Fig. 5 is a right side elevation of the container indicated in Fig. 4;

Fig. 6 is a somewhat schematic fragmentary plan of an operating station indicating the control mechanism as indicated in Fig. 3;

Fig. 7 is a fragmentary vertical section taken along the line 7—7 of Fig. 6;

Fig. 8 is a fragmentary vertical section taken along the line 8—8 of Fig. 6;

Fig. 9 is a fragmentary section similar to Fig. 3 and indicating a position of a control mechanism during the various phases of its operation;

Fig. 10 is a horizontal section taken along the line 10—10 of Fig. 9;

Fig. 11 is a vertical section taken along the line 11—11 of Fig. 9;

Fig. 12 is a view similar to Fig. 1 but indicating another operative position of the control mechanism;

Fig. 13 is a horizontal section taken on the line 13—13 of Fig. 12;

Fig. 14 is a vertical section taken on the line 14—14 of Fig. 12;

Fig. 15 is a fragmentary section similar to Fig. 9 of another operative position of a control mechanism;

Fig. 16 is a horizontal section taken on the line 16—16 of Fig. 15;

Fig. 17 is a vertical section taken on the line 17—17 of Fig. 15;

Figure 1:
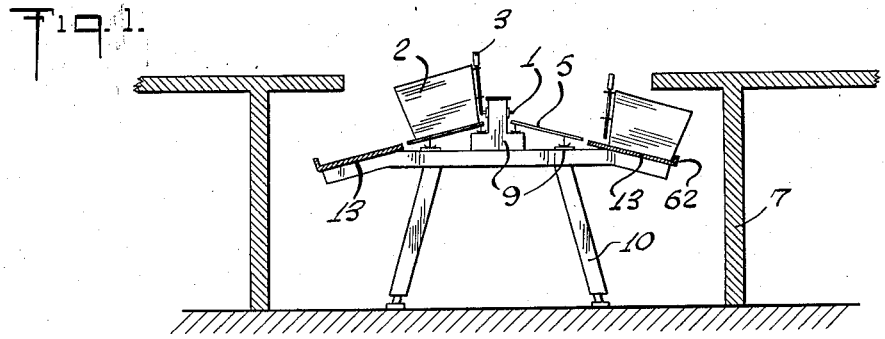
Fig. 1 is a somewhat schematic sectional view of an operating station for a conveyor system including the controls for selectively distributing containers to the various operating stations constructed in accordance with the invention.
Figure 2:
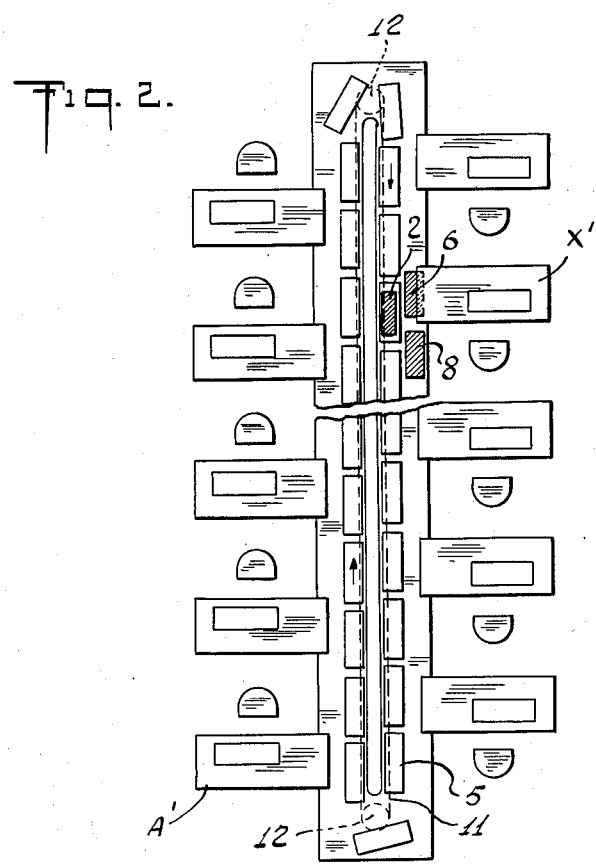
Fig. 2 is a fragmentary plan view of the overall conveyor system.

Referring to the drawings in particular the invention embodied therein includes a central conveyor trestle 10 having guide faces 9 located at different elevations to permit continuous movement of container support platform 5 around a prescribed path such as a substantially oval path by means of an endless belt conveyor 11 to which each of the platforms is connected. (Fig. 2.) The endless belt 11 extends over driving pulleys 12 located at each end of the trestle 10. The container supports 5 are transported by the conveyor such as an endless chain 11 the reversal of which is brought about by one of the sprocket wheels or pulleys 12, which are connected to a suitable power source (not shown) to drive the endless chain 11 through elongated paths in which are situated a plurality of working tables 60. At each of the working tables the trestle 10 is provided with downwardly slanting slide members 13 arranged at the same angle as the platforms 5 and located to receive a container 2 when controls are effective to dump the container into a reserve position 6. The slide is provided with an upstanding portion 62 to support the container in a reserve position 6 or an operating position 8. An operator may manually move the container 2 from a reserve position 6 to an operating position 8 or the controls may be set to deliver the container 2 from the conveyor into either the reserve or operating positions. The conveyor 11 is continuously rotated by mechanism (not shown) driving through the pulleys 12 and containers may be placed as desired on the platforms for movement therewith.

Each of the containers 2 are advantageously rectangular and are provided with beveled bottom side edges and downwardly extending side wall abutments 15 forming a recess which is positioned over an upwardly extending latch member 16. The container 2 is held in an inclined position with the downwardly extending portion 15 positioned over the upwardly extending portion 16 of the support 5 during transportation around on the conveyor 11. Articles requiring operations thereon are placed in the container 2 and transported therewith to a desired operating station.

In accordance with the invention, each of the operating stations are set to receive a container of a certain type. The container 2 in itself is set so that the controls at the operation station for which it is destined will effect discharge of the container from the conveyor downwardly on the slide 13. Each container 2 is provided with means for operating a control device 1 located at each of the operating stations. This means includes two adjustable contacts 3 and a fixed contact 4 as indicated in Fig. 5. The adjustable contacts 3 may be positioned in any one of a plurality of positions by sliding it along an outwardly extending upper portion or notched bar 3a to give 100 different control settings for allocation to a various operating station. Numerical designations for these 100 different groups are indicated in the plan view in Fig. 4.

At each operating station there are provided three angle or contact levers 17 which extend through bolts 19 rotatably mounted in a supporting casing member 20 located at each station. Each of the angle levers 17 are biased in a direction extending directly outwardly toward the path of the moving conveyor and may be turned by biasing the springs 18 when they are actuated by contacts 3 and 4 of a passing container 2. At least two of the three angle levers 17 mounted on a supporting casing 20 are movable longitudinally in the path 21 of the contacts 3 and 4 and may be secured by clamps. The casing 20 of the third angle lever 17 may advantageously be stationary as indicated in Fig. 6.

The supporting casing 20 for the angle lever 17 are slidable along a supporting bar 20a and they may be anchored in a selected position therealong.

The angle levers 17 are adjusted to permit them to cooperate with two slidable fingers 25 to effect controlled discharge of a container 2 at a given operating station. The fingers 25 may be slid along a slot 64 defined in a discharge flap 24 which is pivotable at its end on pivot 27. The fingers may be clamped in position to bring an index thereon into alignment with any one of the corresponding numbers on adjacent scales 66. When they are thus positioned they may be clamped into position by means of screws 68. The outer end of each of fingers 25 is provided with an oblique face 23.

When the reserve station 6 is empty a rounded head 28 of the double armed lever 30 which is pivotally mounted on the station as at 29 presses upwardly against the discharge flap 24 biased upwardly due to the weight G' of a link 33 which is pivotally connected to the opposite end of the double armed lever and to an arm 32 of a crank arm which is pivoted at 31. Link 33 interconnects arm 32 and 30. The upward biasing of the head 28 against the flap 24 causes a contact 26 to press against the rounded ends of the angle levers 17 and the contact faces 23 to press against the rounded ends of the other contact levers. The lever 32 of provided with a rounded head 34 which presses against a pressure element 35 which extends upwardly at a central location on the slide member 13 at the location of the reserve station 6.

When an empty container support 5 passes the control device 1 at a work station there will be no actuation of the contacts at the angle levers 17. The rounded end 22 of the angle levers 17 all abut against fingers 25 and the contact 26 which are pressed upwardly by the lever 30 (Fig. 10). In this manner no tilting of the discharge flap 24 is possible. A control wedge 36 is rigidly secured to the container support 5 and extends above the edge of the discharge flap 24 (Figs. 8, 9, 11). When a container support 5 carrying a container 2 with a nonoperative setting of the contact members 3 passes the control device 1 of a work station, the angle levers 17 will be turned, but not all three of them will be turned simultaneously so that an any time the rounded end 22 of at least one lever 17 will be above a finger 25 or a contact 26 of the discharge flap 24 (Fig. 13) and the flap will not be moved upwardly. Thus, in the nonoperative position of the contact members 3 a tilting of the discharge flap 24 by the lever 30 will not be possible. The control 36 of the container support 5 again passes above the edge 37 of the discharge flap 24 (Figs. 12 and 14). The container 2 on the support 5 is therefore being passed on.

Figure 18:
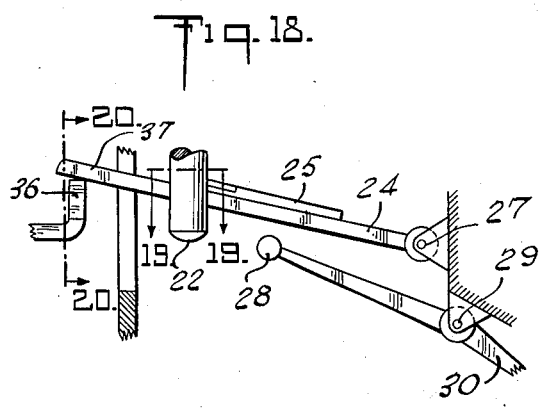
Fig. 18 is a view similar to Fig. 9 but indicating another operative position of the control mechanism.
Figure 20:
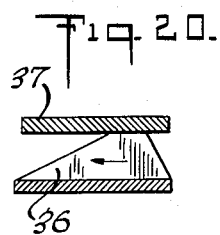
Fig. 20 is a vertical section taken on the line 20—20 of Fig. 19.
Figure 19:
Fig. 19 is a horizontal section taken on the line 19—19 of Fig. 18.
Figure 23:
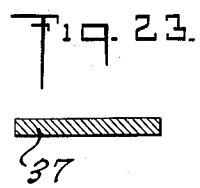
Fig. 23 is a vertical section taken on the line 23—23 of Fig. 21.

When a container 2 with an operative contact setting on the container support 5 passes the control device 1 of a work station, all three angle levers 17 are turned simultaneously (Fig. 16). Since in this case the rounded end 22 of the levers 17 simultaneously release the fingers 25 and the contacts 26, the weight of the levers system can become effective. The discharge flap 24 is thereby tilted so far that the edge 37 of the flap 24 can be moved onto the slanting front edge 38 of control wedge 36 which is moved continuously together with the container support 5 (Figs. 15 and 17). Flap 24 is lifted further without the weight G of the lever system being effective any longer (Figs. 18, 19 and 20). The edge 37 of the flap 24 lifts the container 2 at its rear edge to such a degree that the engagement between the holding abutment 15 of container 2 and the upwardly extending catch 16 of the container support 5 is interrupted (Fig. 3), and the container 2 slides into the reserve station under its own weight. The edge 37 of flap 24 has meanwhile moved off the slanting rear edge 39 of control wedge 36 (Fig. 23).

Figure 21:
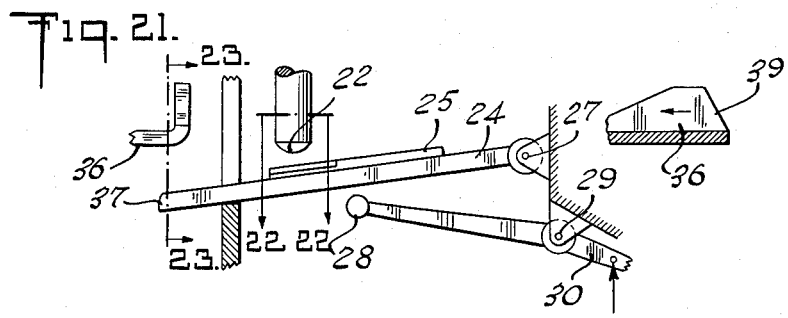
Fig. 21 is a fragmentary sectional view similar to Fig. 9 but indicating the controls in still another operative position.
Figure 22:
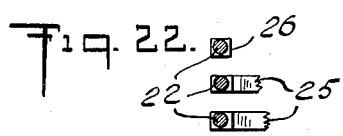
Fig. 22 is a horizontal section taken on the line 22—22 of Fig. 21.

When a container is in the reserve station 6 it weighs on the pressure element 35 (Fig. 3) whereby levers 32 and 30 are rocked to an extent that the flap will no longer be in contact with the head of the lever 30 (Fig. 21). The angle levers 17 may be returned into ready position by means of the torsion springs 18 but their rounded ends 22 are not in contact with fingers 25 or contact 26 (Figs. 21 and 22).

As long as a reserve station 6 is occupied each passing container 2 will turn angle levers 17 but flap 24 is positioned out of contact with the head 28 so that there will be no upward movement of the flap and lifting of the container so that it may be slid off the conveyor. Thus, each of the containers moves past the working station whenever any container is positioned in the reserve station. When, however, the container 2 is moved from the reserve station 6 into the working station 8, the weight G of the levers system becomes again effective to move the head 28 against the discharge flap 24 (Fig. 9). Then the control device 1 is ready to release the following container 2 from its support 5 in a manner described so that it will be capable of taking up the reserve station 6.

Several working stations may be assigned the same station designation and it is accomplished in that way so that a container 2 leaves its support 5 at a second working station when the reserve station 6 of the first working station is occupied. In a similar manner the container, of course, may be released at a third or a further station when the previous working station or stations are not free.

The control device of each working station can be set readily to any desired station designation by the control mechanism and without changing any of the parts of the device. Thus, the invention provides a simple manner of controlling a conveyor distributing system so that containers may be selectively delivered to any one of a plurality of working stations. The invention provides means for setting the container so that it will be accepted by either one or a plurality of stations and includes safety factors to prevent the discharge of the container in the event the station is already occupied.

While a specific embodiment of the invention has been shown and described in detail to illustrate the application of the invention principles, it will be understood that the invention may be embodied otherwise without departing from such principles.

What is claimed is:

1. In a conveyor system comprising conveyor means, inclined container supports carried by said conveyor means and movable past a plurality of operating stations, each of said operating stations including an inclined slide adjacent said conveyor in alignment with said container support, upstanding means on said support to permit hooking of a container thereon, and a container on said support including a recess portion positioned over said upstanding portion to hold the container on the support; the improvement comprising, control means for selectively discharging a container at a preselected station including a plurality of control levers rotatably mounted adjacent each station, means to bias one end of said control levers outwardly into the path of movement of said containers on said conveyor, a container lifting member pivotally mounted at each station and biased upwardly against said control levers, and control contact members located at predetermined spaced positions along the length of said container and extending outwardly therefrom to move in a path to intersect said control lever, said contact control means being effective to rotate said levers against said biasing and to move the opposite end off said container lifting member, said container lifting member being effective to move against a lower edge of said container and to lift said container off said upstanding portion of said conveyor support member and cause said container to exit from said support and slide down said slide member, said control levers and said contact means on said container being so spaced whereby each of said control levers are actuated simultaneously by said contact control means at the station which is set to receive said container.

2. In a conveyor system according to claim 1 wherein said contact control means includes a rod member extending outwardly from a side of said container adjacent said control lever.

3. In a conveyor system according to claim 1 wherein said container is provided with an outwardly extending upper portion and said contact control means includes at least one adjustably positionable rod positioned in a selected location on said laterally extending portion.

4. In a conveyor system according to claim 3, wherein said outwardly extending upper portion includes a notched bar and wherein said rod is slidable along said bar.

5. In a conveyor system according to claim 1 wherein said control levers include at least two longitudinally adjustable lever members and a stationary control lever member.

6. In a conveyor system according to claim 1 wherein said control lever is an L-shaped member rotatably mounted adjacent said container lifting member and may be adjustably positioned along the length of path of said conveyor, and wherein said container lifting member is pivotally mounted at its one end at said operating station and includes an outstanding bar member longitudinally slidable on said container lifting member into alignment with one end of said control lever whereby to hold said container lifting member against upward movement except upon actuation of said control lever by said control contact means of said container.

7. A distribution control system comprising a plurality of spaced operating stations, a conveyor arranged to move past each of said stations, a container positioned on said conveyor, said conveyor having an inclined container supporting surface, a container positioned on said surface and held thereon by an outstanding portion of said conveyor, a conveyor dumping control lever rotatably mounted at said operating station, said control lever including one end extending outwardly toward the path of movement of said conveyor, an opposite end extending inwardly, a container lifting member pivotally mounted at one end at said operating station and having an opposite end biased upwardly against the opposite end of said control lever, and means extending outwardly from said container to rotate said control lever when said container is moved into association therewith and to free the end of said container lifting member whereby the latter moves against the bottom of said container to lift it off said conveyor.

8. A distribution system according to claim 7 including a plurality of adjustably positionable control levers at said operating stations and at least one adjustably positionable contact member extending outwardly from said container and adaptable to move along a path intersecting said control levers.

9. A distribution system according to claim 7 wherein said operating stations are provided with inclined slides adjacent said conveyor arranged to receive articles dumped from said conveyor, and sensing means on said slide connected to said conveyor lifting member and effective to stop operations thereof whenever a container is positioned in said slide.

10. A distribution system according to claim 7 wherein there are at least two adjustable lever members and a stationary lever member.

References Cited in the file of this patent
UNITED STATES PATENTS

| | | |
|---|---|---|
| 2,919,790 | Winz | Jan. 5, 1960 |
| 2,931,484 | Muller | Apr. 5, 1960 |